United States Patent Office 3,421,616
Patented Jan. 14, 1969

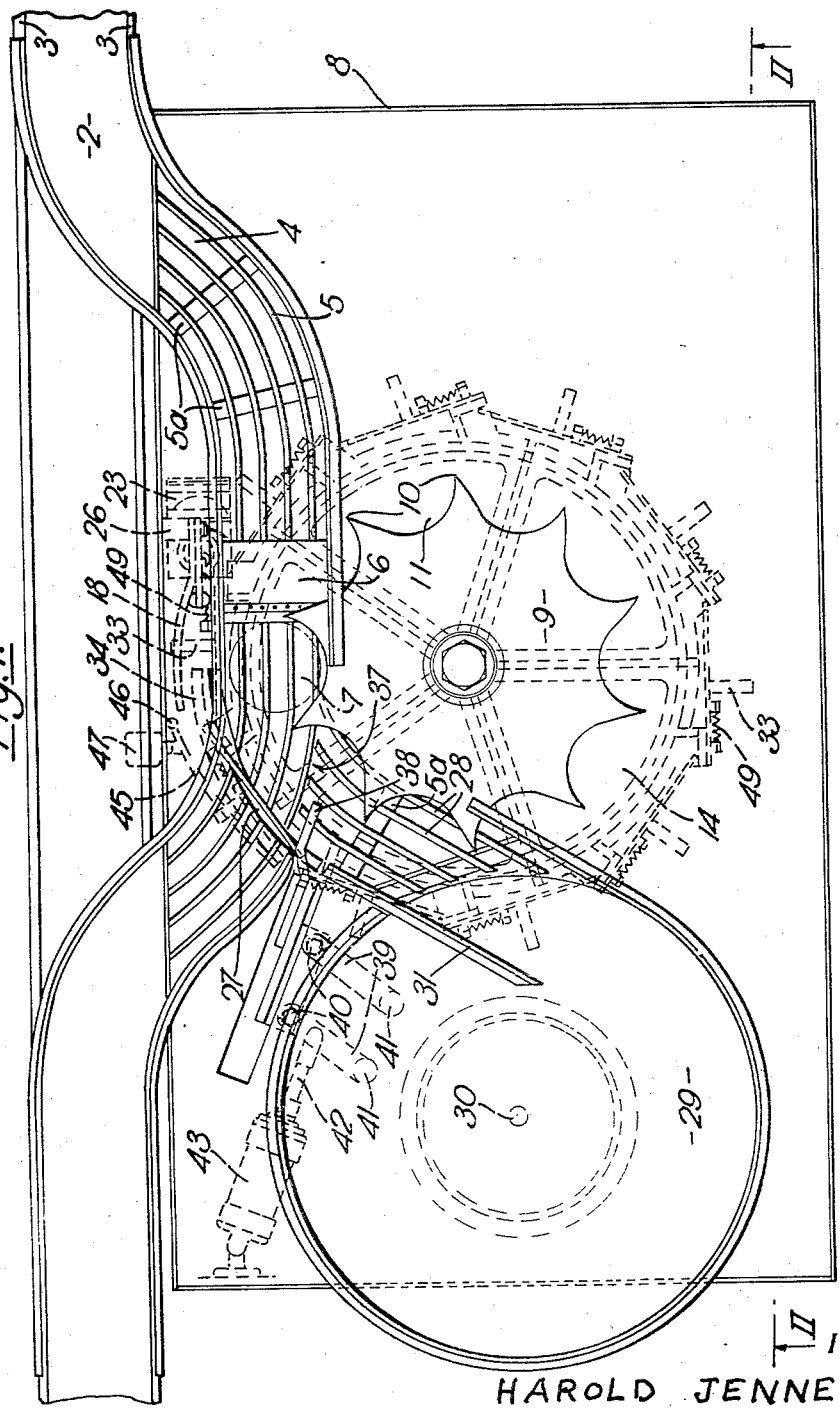

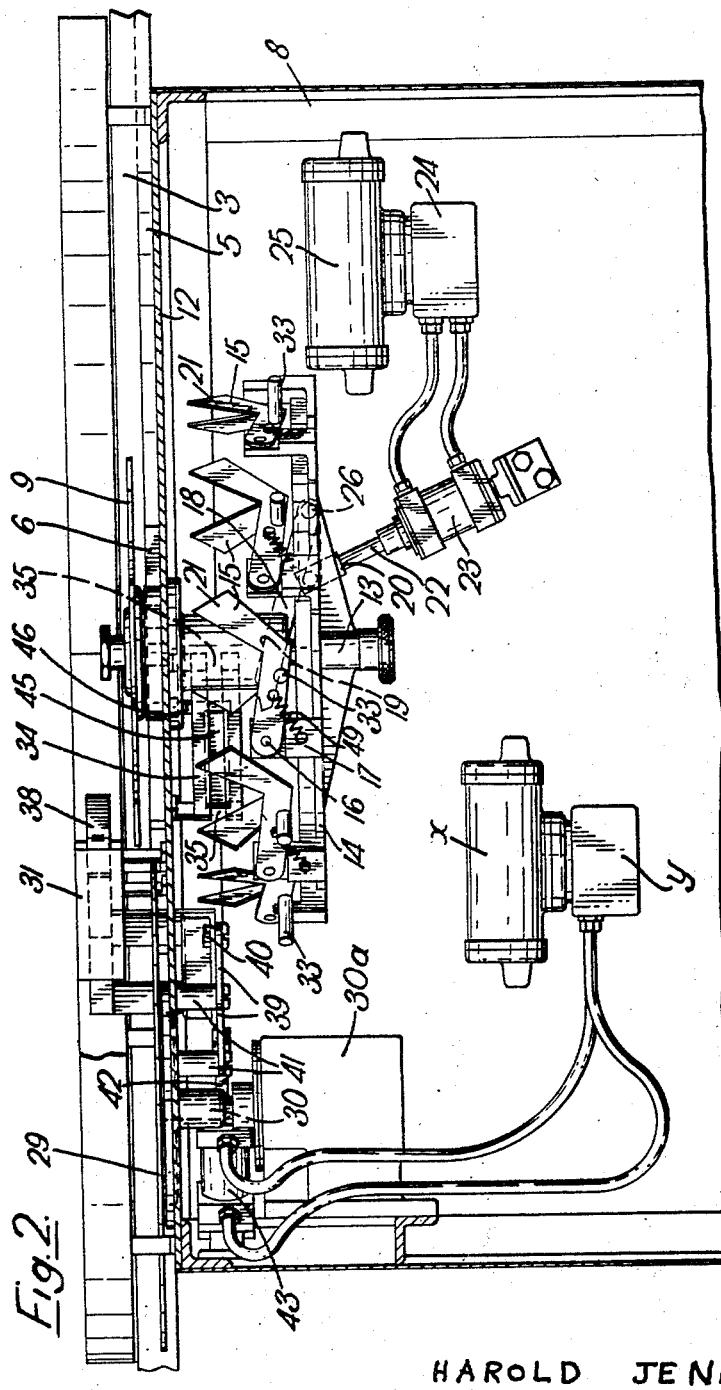

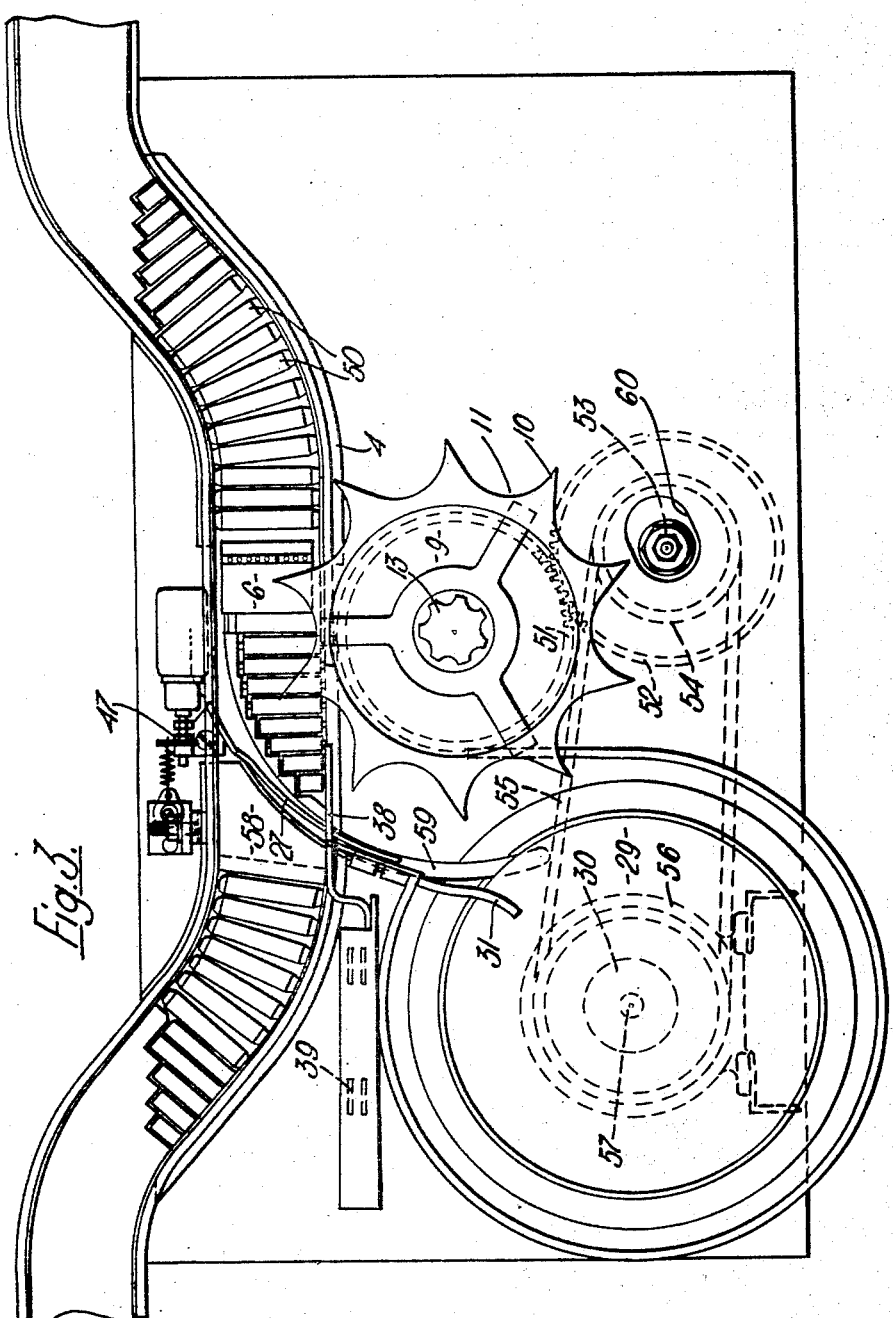

3,421,616
EJECTOR APPARATUS FOR ARTICLE FEEDLINES
Harold Jenner and Jack R. Madley, London, England, assignors to Udec Limited, London, England, a corporation of Great Britain
Filed May 9, 1967, Ser. No. 637,197
Claims priority, application Great Britain, May 11, 1966, 20,963/66
U.S. Cl. 209—74  12 Claims
Int. Cl. B07c 5/00

ABSTRACT OF THE DISCLOSURE

An ejector apparatus, for use in a feedline of articles moving in succession, for rejecting articles moving in succession, for rejecting articles in response to a signal from a detecting device, said apparatus comprising a feed path for said articles, a rotor having a plurality of spaced projections movable in said path to be engaged by said articles, a plurality of deflectors movably mounted on a carrier normally clear of said articles, a device responsive to said signal to move at least one deflector into the path of said articles, a guide responsive to said signal to move into said article path whereby said articles if detected are ejected from said path, a gate device responsive to said signal to permit said detected and diverted articles to leave said path, and table to receive said diverted articles from said gate device.

BACKGROUND OF THE INVENTION

Field of the invention

This invention relates to ejector apparatus for use in a feedline of articles in succession to eject a selected article or articles from the feedline. Such devices can be used to eject articles such as bottles, jars or cans from a feedline in which they move one after another in succession, the ejection being for any reason such as the articles being found to be not properly cleaned or containing foreign bodies for example.

Description of prior art

In the milk industry where milk is filled into standard sized bottles for retail, e.g., half-pint, pint or quart sized bottles, the bottles have inter alia to be checked for the presence therein of foreign bodies such as glass chips, before they are filled. The bottles are fed along a conveyor line past a scanning device which operates to initiate a signal when a contaminated bottle is detected, to cause an ejector device to eject the contaminated bottle from the feedline.

In some known ejector devices co-operating with such a detector device, the bottles are fed past the detection device and, downstream of the detection device in the feed line, a gate is provided which when actuated swings across the feed line to deflect a contaminated bottle out of the line. Such a gate must however return to the rest position clear of the feedline to permit the succeeding bottle, if uncontaminated, to continue to move in the feedline. The gate must therefore move rapidly from rest to the bottle ejecting position and tends to have a snatch action on the bottles.

With such known ejector devices, there is a tendency when the speed of bottle feed changes, or fluctuates, for the gate to jam against the bottles and this tendency increases with the bottle speed: above a speed of about 400 bottles per minute the action of the gate may be unsatisfactory and jams may occur which renders this form of gate unsuitable for higher speeds, e.g., 600 bottles per minute. Moreover the faster the speed of the bottles the more accurate must the apparatus be since there is a time lag between the detection of a contaminated bottle and the operation of the gate due to the distance between the detection device and the gate, e.g., the diameter of about two to three bottles, so that a very accurate delay device has to be provided in the means for actuating the gate in response to a signal from the detecting device.

The main object of the present invention is to provide an improved ejector device for use in the feed line of articles, e.g., milk bottles, fed in succession past a detection device, in which the aforesaid disadvantages are minimised or eliminated.

SUMMARY

According to the present invention an ejector apparatus for use in a feedline of articles moving in succession for rejecting one or more articles therefrom in response to a signal received from a detecting device, comprises a feed path along which the articles move in succession, a rotor rotatably mounted on the frame of the apparatus and having a plurality of projecting elements movable in said path so as to be engaged by the articles, a plurality of deflectors supported on a carrier normally clear of articles in said path and displaceable so as to move with an article and to co-operate with the rotor to divert the article from said path, a deflector actuator operable in response to a signal from the detecting device to move a deflector into the diverting position, and a gate device normally located to permit the articles to move in said path but operable to permit an article to leave said path under the influence of the rotor and a deflector co-operating therewith, the gate device being actuated by a signal initiated when a deflector is moved to a diverting position.

In a preferred construction the deflectors are freely pivoted on the carrier and a guide is provided to maintain a deflector in the diverting position until the article has left said path.

A gate control device is preferably provided in the path of a diverting deflector and operable thereby to cause actuation of the gate device so that the gate device moves out of the path of an article as it leaves said path.

The gate device may be actuated by an electromagnetic device in an electric circuit energised by closure of a switch actuated by a deflector in the article diverting position.

In a preferred construction the articles move in a path in the form of a track along which they are impelled from behind by succeeding articles, the deflectors are normally carried on the carrier beneath the track and are raised to project above the track to cooperate with the rotor elements to divert the article from the track through the gate device.

The rotor and the deflector carrier are preferably coaxially mounted and interconnected to rotate as a unit, each deflector being mounted so that when moved to the diverting position its article engaging portion is disposed between rotor radii through two adjacent rotor elements.

Preferably a raised deflector is on the opposite side of the track to the rotor axis of rotation and a gap is provided across the track through which the raised deflector passes as it diverts an article from the track.

BRIEF DESCRIPTION OF DRAWINGS

In order that the invention may be more fully understood two embodiments in accordance therewith will now be described by way of example with reference to the accompanying drawings in which:

FIGURE 1 is a plan view of the apparatus;

FIGURE 2 is a partial cross-section of the apparatus taken on the line II—II of FIGURE 1 looking in the direction of the arrows; and FIGURE 3 is a plan view similar to FIGURE 1 of a modified construction.

In the drawings the same references are used to designate the same or similar parts.

DESCRIPTION OF PREFERRED EMBODIMENTS

Referring to the drawings FIGURES 1 and 2 show an apparatus for ejecting from a feedline milk bottles which pass a detection device and, if detected as containing a foreign body such as a glass chip, are rejected from the feedline. The bottles are fed from the right in FIGURE 1 along a path defined by a moving conveyor 2 and upstanding guide or side walls 3, the path of the apparatus to be described shown at 4, hereinafter referred to as the "main track" being a loop off the line of the conveyor 2 and is a dead track, that is to say the bottles are not moved by the conveyor directly along the track. The main track 4 in fact is formed by spaced parallel bars 5 of suitable material, polytetrafluoroethylene being preferred in view of its low coefficient of friction between itself and bottoms of the bottles riding thereon the bars being supported in spaced relationship by blocks 5a of polytetrafluoroethylene, for example, the detecting device shown at 6 in FIGURE 1 is in the midportion of the main track 4 and may be of any suitable construction. In FIGURE 1 one bottle 7 is indicated by dot-dash line and it will be seen that the distance between the walls across the main track 4 is greater than the diameter of a bottle so that the bottle can move freely along the track but is retained thereon by the walls; as the apparatus is constructed for use with bottles of different sizes, i.e., half pint, pint or quart bottles, both the guides 3 in FIGURE 1 are adjustable towards or away from each other so that the width of the track will accommodate bottles of different widths. As each bottle passes over the detecting device 6 it is scanned and if any foreign body is in the bottle which is detected by the device 6, the device 6 will emit a signal for the purpose to be described.

When on the conveyor 2 the bottles are advanced from right to left in FIGURE 1 so that when the bottles arrive on the main track 4 they are propelled therealong by the succeeding bottles pushing against them and the bottles which are not ejected from the track 4 in a manner to be described, are returned to the conveyor 2 at the left hand side of FIGURE 1 whence they are passed to other apparatus such, for example, as a bottle filling apparatus.

In the frame 8 of the apparatus a rotor 9 is freely rotatably mounted and this rotor has a plurality of projecting elements 10; as seen in FIGURE 2 the rotor is above the plane of the main track 4 and is so mounted and of such size that the projections 10 project into the path of the bottles on the main track 4, each recess 11 between adjacent projections 10 accommodating one bottle as it moves along the main track 4. Since the bottles are advanced along the main track 4 by succeeding bottles pressing against them and since the rotor 9 is freely rotatably mounted in the frame 8, the bottles engaging the projections 10 will rotate the rotor freely.

The rotor 9 is secured to a shaft 13 (FIGURE 2) on which is secured a carrier 14 having mounted thereon a plurality of deflectors 15 each pivoted at 16 to a boss 17 on the carrier 14, the number of deflectors being equal to the number of recesses 11 in the rotor 9. Secured on the frame 8 is a deflector actuator 18 having a cam surface 19 which can be raised by a device 20. The actuator 18 is disposed just to the right of the device 6 in FIGURE 1 so that it will raise a deflector at that position to bring the toe 21 of the raised deflector above the top side of the main track 4 and thus cooperate with the opposite recess in the rotor 9 to contain the bottle 7 and prevent it leaving the main track as will be described.

The device 20 is mounted on the piston rod 22 of a cylinder 23 actuated as by air pressure from a valve 24 itself actuated by an electromagnetic device 25 such as a solenoid which is energised when a signal is received from the device 6. At the end of the scanning of a bottle in which the detecting device detects a foreign body, the detecting device produces an output signal which is fed to the solenoid 25 and actuates the valve 24 and causes the device 20 to be raised thereby raising the actuator 18 about its pivot 26 on the apparatus frame 8 at the appropriate time to reject the faulty bottle.

The track 4 has a gap 27 extending across it in an arcuate direction permitting a raised deflector toe 21 to pass across the track and co-operate with the elements 10 of the rotor to move the bottle out of the main track 4 onto a takeoff track 28 and thence onto a driven turntable 29 which is mounted on the spindle 30 of a motor 30a fixed to the frame 8. The rotation of the turntable ensures that a rejected bottle arriving on the turntable 29 will be moved out of the path of any succeeding rejected bottle arriving on the turntable. Rejected bottles may build up on the turntable 29 which is large enough to accommodate several bottles but when the leading bottle on the turntable 29 strikes the wall 31 it will be prevented from fouling the next bottle coming from the takeoff track 28. An operator removes the ejected bottles from the turntable 29. Any suitable receiver of the ejected bottles may, however, be used, for example, a chute down which the bottles will move to a collecting receptacle.

Each deflector 15 carries a pin 33 projecting outwards from the carrier 14 and to raise the deflectors, the actuator 18 in fact engages the pin 33 and lifts the deflector against the force of gravity about the pivot 16, so that when the deflector passes out of the range of the actuator 18 it would normally fall by gravity back into its rest or inoperative position shown in FIGURE 1.

Since the actuator 18 will cease to hold up the deflector 15 by the time it moves through the gap 27, a guide 34 having a horizontal slot 35 is mounted on the frame 8 in an arcuate path at the side of the slot 27 in which the pin 33 of a raised deflector moves, thus being held up and co-operating with the rotor to deflect the bottle from the main track 4 onto the takeoff track 28. The guide 34 terminates in an anticlockwise direction in FIGURE 1 adjacent to the gate 38, i.e., just before the end of the slot 27 so that the deflector falls below the top plate 12 of the frame 8 without fouling it.

When a bottle 7 passes the detecting device 6 without being detected as contaminated it is essential that bottle moves along the main track 4 back onto the conveyor 2 and therefore the gap 37 through which ejected bottles move onto the turntable 29 must be closed to prevent the bottle leaving the main track 4; for this purpose a gate 38 normally extends horizontally across the gap 37 sufficiently far to guide the bottle on the main track back onto the conveyor 2; the gate 38 as seen in FIGURE 2 is above the plane of the rotor 9 and does not therefore foul the projections 10 as they rotate freely under the influence of the bottles moving past the scanning device 6.

The gate 38 is carried on arms 39 shown horizontal in FIGURE 1 but they may be vertical and are pivoted at 40 to the gate while their other ends 41 are pivoted to the frame 8. Thus the arms and the gate form a parallelogram so that the gate can be moved to the left and downwardly out of the path of a bottle being ejected (FIGURE 2). The arms are actuated by the rod 42 of a cylinder 43 pivoted at 44 to the frame 8 and supplied with compressed air from the valve 24 or another suitable valve not shown.

Beneath the top plate 12 of the frame 8 a gate control device is mounted comprising an arm 45 pivoted at 46 to the frame 8 and extending along the side of the gap 27 so as to be deflected by a raised deflector 15 thereby actutating a microswitch 47 which initiates a signal to the solenoid X to actuate the valve Y and cause the rod 42 to move the gate out of the path of a bottle being ejected. As soon as the raised deflector 15 drops out of the gap 27 it will leave the arm 45 and the switch 47 will be opened so that the cylinder 43 will actuate the gate and reclose the gap 37.

As herein described the apparatus operates to eject any one bottle from the feedline of bottles, but should two bottles in succession be scanned as contaminated then the actuator 18 will remain raised for two deflectors so that both bottles will pass out of the gap 37 onto the turntable 29 and after the first deflector has left the arm 45 the second deflector will then engage the arm 45 keeping the switch 47 closed and thus the gate 38 open for the second bottle. Thus however many bottles in succession are scanned as contaminated the apparatus will actuate to eject all these bottles and if one bottle between a number of contaminated bottles moves along the line that bottle will be allowed to continue back onto the conveyor 2 because no deflector will be raised and the gate will shut for that one bottle to pass and reopen for the succeeding contaminated bottles.

It will be observed that the whole apparatus is actuated by the bottles themselves and will therefore run at the speed of the bottles and necessitates no driving mechanism which has to be actuated in time relation to the signals emanating from the deflecting device 6. Moreover since the number of moving parts is small the device will operate satisfactorily at whatever speed the bottles are fed through thereby making it extremely suitable for high speed bottle detection and feed along the feed line, e.g., of 600 bottle per minute or higher.

Minor modifications are permissible, for example, a spring 49 may be provided to assist the deflectors 15 being pulled back below the main track 4 after they leave the guide 34 and the toes of the deflectors 15 although shown as pointed may be of any suitable construction as will be understood. Although the actuator 18 is described as having beein raised and lowered by the cylinder 23, and the gate 38 has been described as operable by a cylinder 43, nevertheless both these devices may be actuated direct by the moving armature of a solenoid or solenoids such as X and 25.

Referring to FIGURE 3, this shows a modification of the apparatus shown in FIGURES 1 and 2. In the modified construction of FIGURE 3, the track 4 is formed of a plurality of freely rotatable rollers 50, preferably having surfaces of nylon or polytetrafluoroethylene; the portion of the track of the detecting device 6 is, however, solid, such as a polytetrafluoroethylene plate, and the portion 58 of the track is similarly formed as a flat plate with an arcuate aperture 59 therein for the deflectors to operate as described with reference to FIGURES 1 and 2. Moreover the arms 39 are vertically disposed and pivot about horizontal axis. Fast with the shaft 13 is a toothed gear 51 in mesh with a toothed gear 52 on a shaft 53 which in turn is driven by a pulley 54 fast thereon through a belt 55 from a pulley 56 fast on a driven shaft 57 driven by the motor 30. The bottles on the track 4 still propel the bottles therealong as described with reference to FIGURES 1 and 2, but the aforesaid drive acts so that the said drive of the bottles is power assisted by the motor 30. A clutch 60 may be included in the drive of the pulley 54.

We claim:

1. An ejector apparatus for use in a feedline of articles moving in succession for rejecting one or more articles therefrom in response to a signal received from a detecting device, said apparatus comprising a feed path along which articles move in succession, a rotor rotatably mounted on the frame of the apparatus and having a plurality of projecting elements movable in said path so as to be engaged by the articles, a plurality of deflectors supported on a carrier normally clear of articles in said path and displaceable so as to move with an article and to co-operate with the rotor to divert the article from said path, a deflector actuator operable in response to a signal from the detecting device to move a deflector into the diverting position, and a gate device normally located to permit the articles to move in said path but operable to permit an article to leave said path under the influence of the rotor and a deflector co-operating therewith, the gate device being actuated by a signal initiated when a deflector is moved to a diverting position.

2. An apparatus according to claim 1 wherein said deflectors are freely pivoted on said carrier and a guide is provided to maintain each said deflector in said diverting position until said article to be diverted has left said path.

3. An apparatus according to claim 1 wherein a gate control device is disposed in the path of said diverting deflector and operable to cause actuation of said gate device so that it moves out of the path of a rejected article as it leaves said feed path.

4. An apparatus according to claim 1 wherein an electromagnetic device is provided energised by closure of a switch actuated by a deflector in an article diverting position to close said gate device.

5. An apparatus according to claim 1 wherein said feed path comprises a track, and a carrier is mounted on said rotor beneath said track to rotate with said rotor, said deflectors are mounted on said carrier and are raised to project above said track to co-operate with said rotor projections to divert an article through said gate device.

6. An apparatus according to claim 1 wherein said deflectors when raised move on the opposite side of said feed path to said rotor, and a gap is provided across said feed path through which said raised deflector moves in diverting an article through said gate device off said feed path.

7. An apparatus according to claim 1 wherein a table is disposed to receive said rejected articles passing through said gate device, a prime mover is provided to drive said table and a stop is provided to halt movement of said articles on said table.

8. An apparatus according to claim 1 wherein a rotary table is disposed to receive said rejected articles passing through said gate device, power means are provided to rotate said table, and a drive is provided from said power means to said projection rotor to provide power assistance to the drive of said projection rotor by said articles.

9. An apparatus according to claim 1 wherein pressure fluid devices are provided responsive to signals from said detector device, and pressure actuated devices are provided to actuate said deflectors and said gate device.

10. An apparatus according to claim 1 wherein said deflectors are movably mounted on said carrier, elements are provided on said deflectors, a deflector actuating device provided responsive to a singal from said detecting device to engage said elements to move said deflectors into said feed path to cause said article to leave said path.

11. An apparatus according to claim 10 wherein a movable guide is provided to maintain each said deflector in said diverting position until said article to be diverted has left said path.

12. An apparatus according to claim 1 wherein said projection rotor and said carrier with said deflectors are rotated by said articles moving in said feed path.

References Cited

UNITED STATES PATENTS 2,606,657   8/1952   Berthelsen _____ 209—82 X
2,609,926   9/1952   Hartig _____ 209—74

M. HENSON WOOD, Jr., *Primary Examiner.*

RICHARD A. SCHACHER, *Assistant Examiner.*